United States Patent
Ananda et al.

(10) Patent No.: US 10,707,979 B2
(45) Date of Patent: Jul. 7, 2020

(54) ESTIMATING A NARROWBAND REFERENCE SIGNAL RECEIVED POWER PARAMETER

(71) Applicant: QUALCOMM Incorporated, San Diego, CA (US)

(72) Inventors: Raghavendra Shyam Ananda, Hyderabad (IN); Srikanth Menon, Hyderabad (IN); Ganesh Nagamani, Hyderabad (IN); Praveen Maruthoormana Purushothaman, Ernakulam (IN); Brian Clarke Banister, San Diego, CA (US); Alberto Rico Alvarino, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/270,169

(22) Filed: Feb. 7, 2019

(65) Prior Publication Data

US 2019/0253162 A1 Aug. 15, 2019

(30) Foreign Application Priority Data

Feb. 13, 2018 (IN) .............................. 201841005397

(51) Int. Cl.
*H04W 4/00* (2018.01)
*H04B 17/327* (2015.01)
(Continued)

(52) U.S. Cl.
CPC .......... *H04B 17/327* (2015.01); *H04W 48/10* (2013.01); *H04W 52/0245* (2013.01); *H04W 52/322* (2013.01); *H04W 52/325* (2013.01)

(58) Field of Classification Search
CPC .... H04B 17/327; H04W 48/10; H04W 48/16; H04W 52/02; H04W 52/0245; H04W 52/32; H04W 52/322; H04W 52/325
See application file for complete search history.

(56) References Cited

U.S. PATENT DOCUMENTS

| 2018/0213468 A1* | 7/2018 | Chatterjee ............. H04L 5/0053 |
| 2019/0387484 A1* | 12/2019 | Ioffe ........................ H04W 4/70 |
| 2020/0059872 A1* | 2/2020 | Liu ........................ H04L 5/0048 |

FOREIGN PATENT DOCUMENTS

WO   WO 2017/13600   *   8/2017

OTHER PUBLICATIONS

3GPP TR 45.820, V13.1.0, 3rd Generation Partnership Project; Technical Specification Group GSM/EDGE Radio Access Network; Cellular system support for ultra-low complexity and low throughput Internet of Things (CIoT) (Release 13), 495 pages, Nov. 2015.*

(Continued)

*Primary Examiner* — Frank Duong
(74) *Attorney, Agent, or Firm* — Steven R. Thiel; Harrity & Harrity LLP

(57) ABSTRACT

Various aspects of the present disclosure generally relate to wireless communication. In some aspects, a user equipment (UE) may receive a plurality of master information blocks (MIBs) on a narrowband physical broadcast channel (NPBCH). The UE may determine an NPBCH signal power based at least in part on the plurality of MIBs. The UE may estimate a narrowband reference signal received power (NRSRP) parameter based at least in part on the NPBCH signal power. In some aspects, a base station may determine whether to enable or disable NPBCH-based estimates of an NRSRP parameter for a UE. The base station may transmit, to the UE, an indication of whether NPBCH-based estimates of the NRSRP parameter are enabled or disabled for the UE (Continued)

based at least in part on the determination. Numerous other aspects are provided.

30 Claims, 13 Drawing Sheets

(51) Int. Cl.
    *H04W 52/02* (2009.01)
    *H04W 48/10* (2009.01)
    *H04W 52/32* (2009.01)

(56) References Cited

OTHER PUBLICATIONS

Samsung, Narrowband IoT—Broadcast Channel Design, 3GPP TSG RAN WG1 Meeting #82bis, 5 pages, Oct. 2015.*
Ericsson, NRSRP and NRSRQ measurement in NB-IoT, 3GPP TSG-RAN WG1 Meeting #87, 6 pages, Nov. 2016.*
Ericsson: "Measurement Accuracy Improvements", 3GPP Draft; R2-1710744 Measurement Accuracy Improvements, 3rd Generation Partnership Project (3GPP), Mobile Competence Centre; 650, Route Des Lucioles; F-06921 Sophia-Antipolis Cedex; France, vol. RAN WG2, No. Prague, Czech Republic; 20171009-20171013 Oct. 8, 2017 (Oct. 8, 2017), XP051342770, Retrieved from the Internet: URL:http://vvww.3gpp.org/ftp/Meetings_3GPP_SYNC/RAN2/Docs/ [retrieved on Oct. 8, 2017], 5 pages.
Ericsson: "Narrowband Measurement Accuracy Improvements", 3GPP Draft; R1-1717015 Narrowband Measurement Accuracy Improvements, 3rd Generation Partnership Project (3GPP), Mobile Competence Centre; 650, Route Des Lucioles; F-06921 Sophia-Antipolis Cedex; France, vol. RAN WG1, No. Prague, Czech Republic; 20171009-20171013 Sep. 30, 2017, XP051351749, Retrieved from the Internet: URL:http://www.3gpp.org/ftp/tsg_ran/WG1_RL1/TSGR1_90b/Docs/ [retrieved on Sep. 30, 2017], 7 pages.
International Search Report and Written Opinion—PCT/US2019/017181—ISA/EPO—dated Apr. 12, 2019.

* cited by examiner

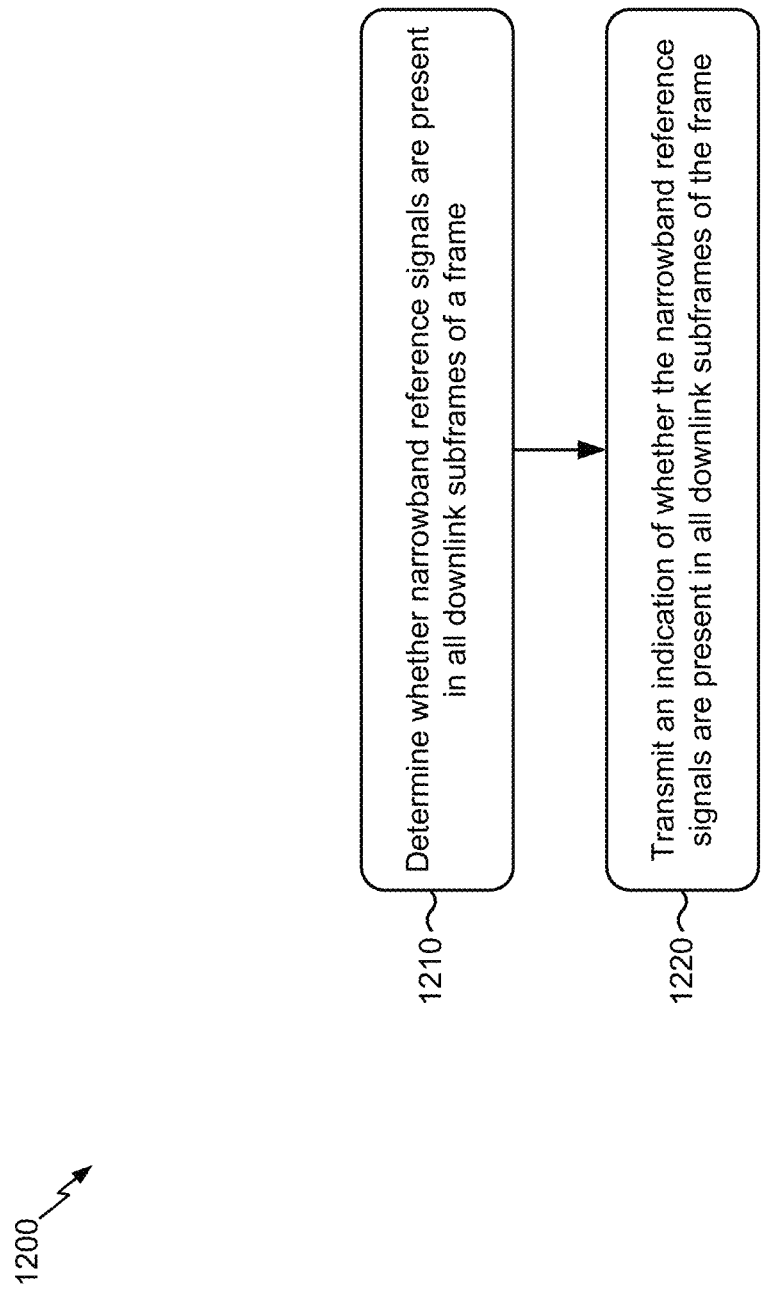

ESTIMATING A NARROWBAND REFERENCE SIGNAL RECEIVED POWER PARAMETER

CROSS-REFERENCE TO RELATED APPLICATIONS UNDER 35 U.S.C. § 119

This application claims priority to Indian Patent Application No. 201841005397, filed on Feb. 13, 2018, entitled "TECHNIQUES AND APPARATUSES FOR ESTIMATING A NARROWBAND REFERENCE SIGNAL RECEIVED POWER PARAMETER," which is hereby expressly incorporated by reference herein.

TECHNICAL FIELD OF THE DISCLOSURE

Aspects of the technology described below generally relate to wireless communication, and more particularly to techniques and apparatuses for estimating a narrowband reference signal received power (NRSRP) parameter. Embodiments and techniques enable and provide wireless communication devices and systems configured for enhanced network coverage and long battery life.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The sole purpose of this summary is to present some concepts of one or more aspects of the disclosure in summary form as a prelude to the more detailed description that is presented later.

In some aspects, a method of wireless communication, performed by a user equipment (UE), may include receiving a plurality of master information blocks (MIBs) on a narrowband physical broadcast channel (NPBCH); determining an NPBCH signal power based at least in part on the plurality of MIBs; and estimating a narrowband reference signal received power (NRSRP) parameter based at least in part on the NPBCH signal power.

In some aspects, a UE for wireless communication may include memory and one or more processors operatively coupled to the memory. The memory and the one or more processors may be configured to receive a plurality of MIBs on an NPBCH; determine an NPBCH signal power based at least in part on the plurality of MIBs; and estimate an NRSRP parameter based at least in part on the NPBCH signal power.

In some aspects, a non-transitory computer-readable medium may store one or more instructions for wireless communication. The one or more instructions, when executed by one or more processors of a UE, may cause the one or more processors to receive a plurality of MIBs on an NPBCH; determine an NPBCH signal power based at least in part on the plurality of MIBs; and estimate an NRSRP parameter based at least in part on the NPBCH signal power.

In some aspects, an apparatus for wireless communication may include means for receiving a MIBs on an NPBCH; means for determining an NPBCH signal power based at least in part on the plurality of MIBs; and means for estimating an NRSRP parameter based at least in part on the NPBCH signal power.

In some aspects, a method of wireless communication, performed by a base station, may include determining whether to enable or disable NPBCH-based estimates of an NRSRP parameter for a UE; and transmitting, to the UE, an indication of whether NPBCH-based estimates of the NRSRP parameter are enabled or disabled for the UE based at least in part on the determination.

In some aspects, a base station for wireless communication may include memory and one or more processors operatively coupled to the memory. The memory and the one or more processors may be configured to determine whether to enable or disable NPBCH-based estimates of an NRSRP parameter for a UE; and transmit, to the UE, an indication of whether NPBCH-based estimates of the NRSRP parameter are enabled or disabled for the UE based at least in part on the determination.

In some aspects, a non-transitory computer-readable medium may store one or more instructions for wireless communication. The one or more instructions, when executed by one or more processors of a base station, may cause the one or more processors to determine whether to enable or disable NPBCH-based estimates of an NRSRP parameter for a UE; and transmit, to the UE, an indication of whether NPBCH-based estimates of the NRSRP parameter are enabled or disabled for the UE based at least in part on the determination.

In some aspects, an apparatus for wireless communication may include means for determining whether to enable or disable NPBCH-based estimates of an NRSRP parameter for a UE; and means for transmitting, to the UE, an indication of whether NPBCH-based estimates of the NRSRP parameter are enabled or disabled for the UE based at least in part on the determination.

In some aspects, a method of wireless communication, performed by a base station, may include determining whether narrowband reference signals are present in all downlink subframes of a frame; and transmitting an indication of whether the narrowband reference signals are present in all downlink subframes of the frame.

In some aspects, a base station for wireless communication may include memory and one or more processors operatively coupled to the memory. The memory and the one or more processors may be configured to determine whether narrowband reference signals are present in all downlink subframes of a frame; and transmit an indication of whether the narrowband reference signals are present in all downlink subframes of the frame.

In some aspects, a non-transitory computer-readable medium may store one or more instructions for wireless communication. The one or more instructions, when executed by one or more processors of a base station, may cause the one or more processors to determine whether narrowband reference signals are present in all downlink subframes of a frame; and transmit an indication of whether the narrowband reference signals are present in all downlink subframes of the frame.

In some aspects, an apparatus for wireless communication may include means for determining whether narrowband reference signals are present in all downlink subframes of a frame; and means for transmitting an indication of whether the narrowband reference signals are present in all downlink subframes of the frame.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 10-12 are diagrams illustrating example processes associated with estimating an NRSRP parameter, in accordance with various aspects of the present disclosure.

DETAILED DESCRIPTION

Figure 1:
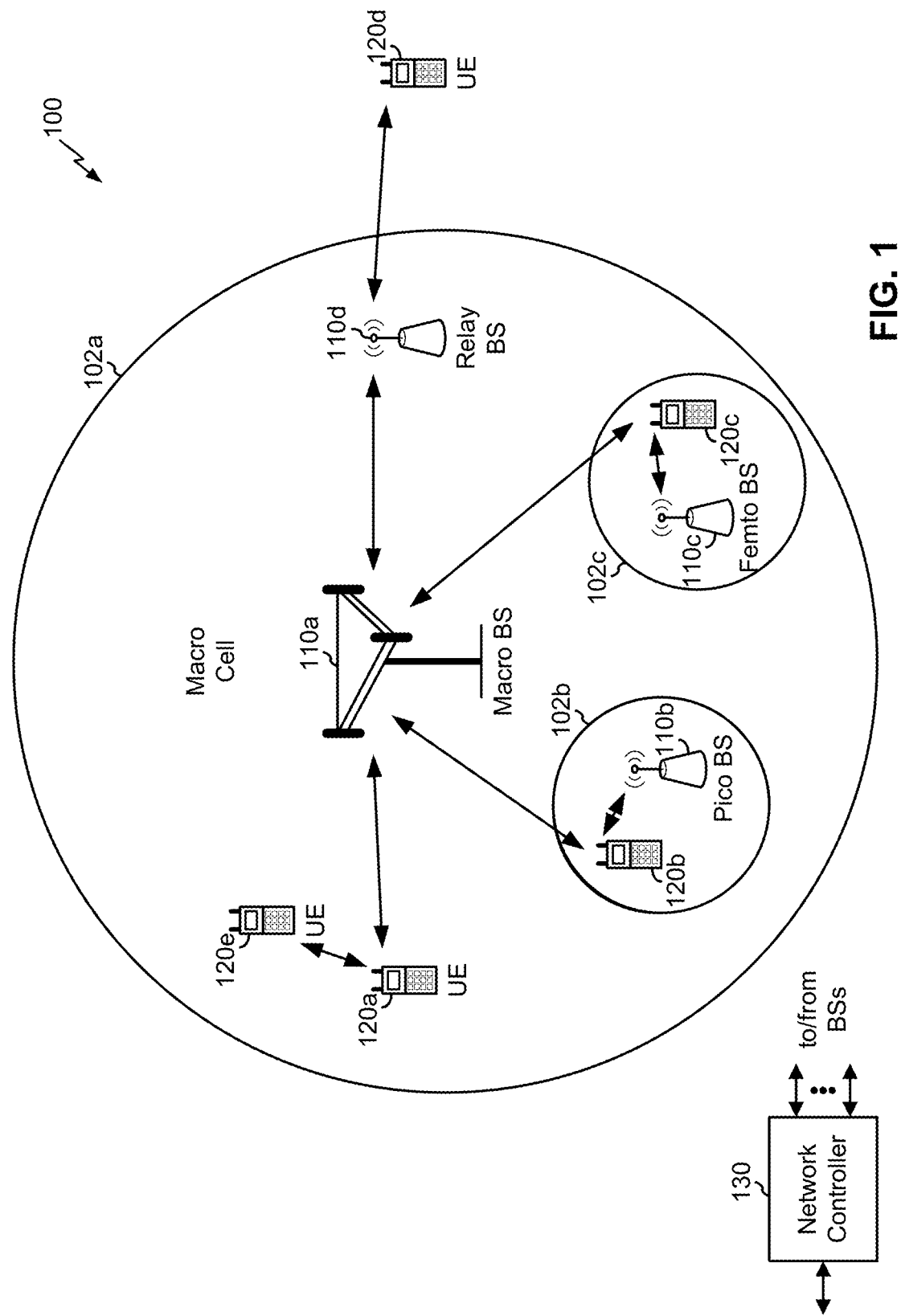
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. In some aspects, a UE may be considered an Internet-of-Things (IoT) device, and/or may be implemented as a narrowband IoT (NB-IoT) UE. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
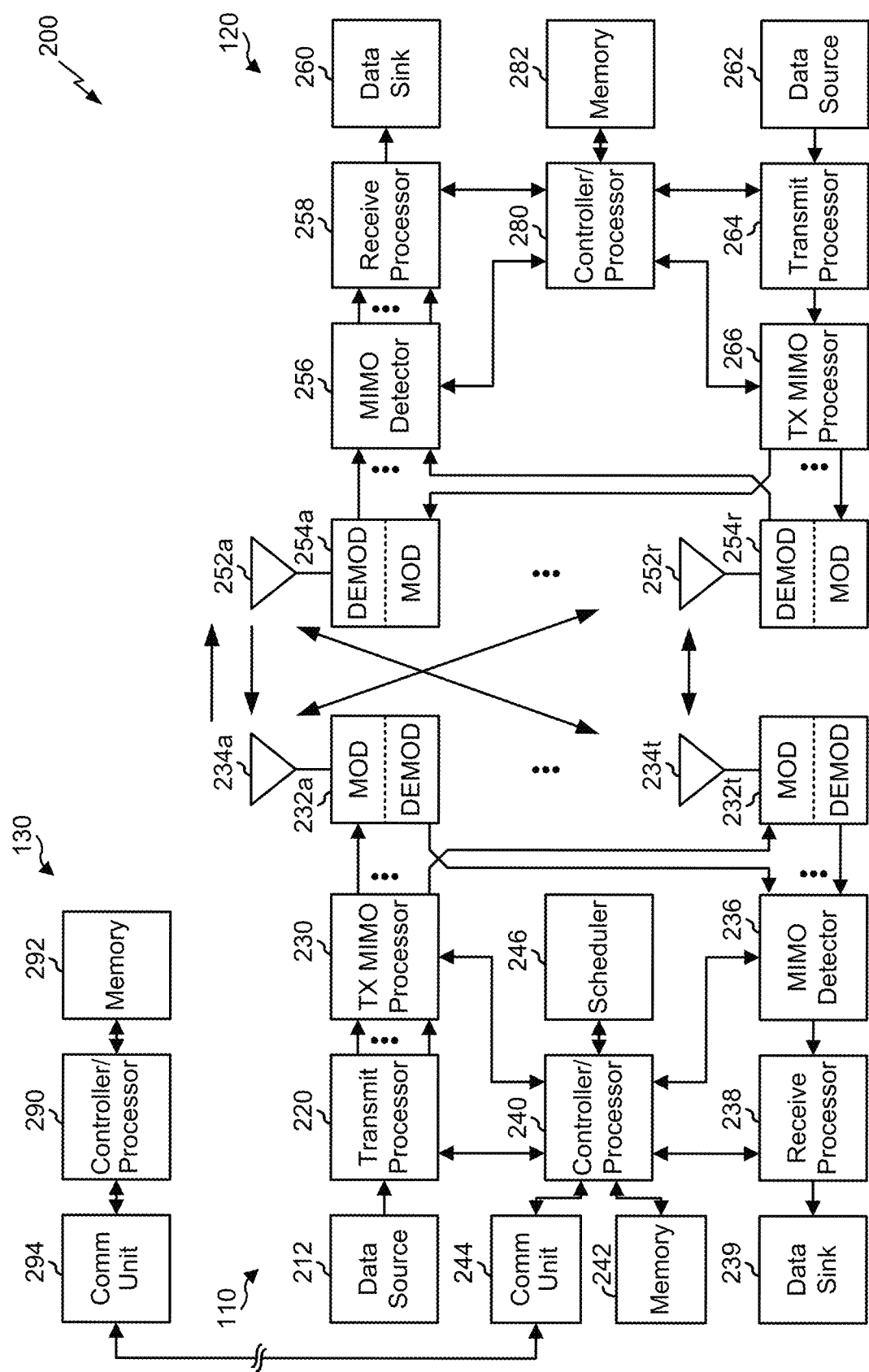
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with estimating an NRSRP parameter, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a plurality of master information blocks (MIBs) on a narrowband physical broadcast channel (NPBCH); means for determining an NPBCH signal power based at least in part on the plurality of MIBs; means for estimating a narrowband reference signal received power (NRSRP) parameter based at least in part on the NPBCH signal power; and/or the like. In some aspects, such means may include one or more components of UE 120 described in connection with FIG. 2.

In some aspects, base station 110 may include means for determining whether to enable or disable NPBCH-based estimates of an NRSRP parameter for a UE 120; means for transmitting, to the UE 120, an indication of whether NPBCH-based estimates of the NRSRP parameter are enabled or disabled for the UE 120 based at least in part on the determination; and/or the like. Additionally, or alternatively, base station 110 may include means for determining whether narrowband reference signals are present in all downlink subframes of a frame; means for transmitting an indication of whether the narrowband reference signals are present in all downlink subframes of the frame; and/or the like. In some aspects, such means may include one or more components of base station 110 described in connection with FIG. 2.

As indicated above, FIG. 2 is provided merely as an example. Other examples may differ from what is described with regard to FIG. 2.

Figure 3A:
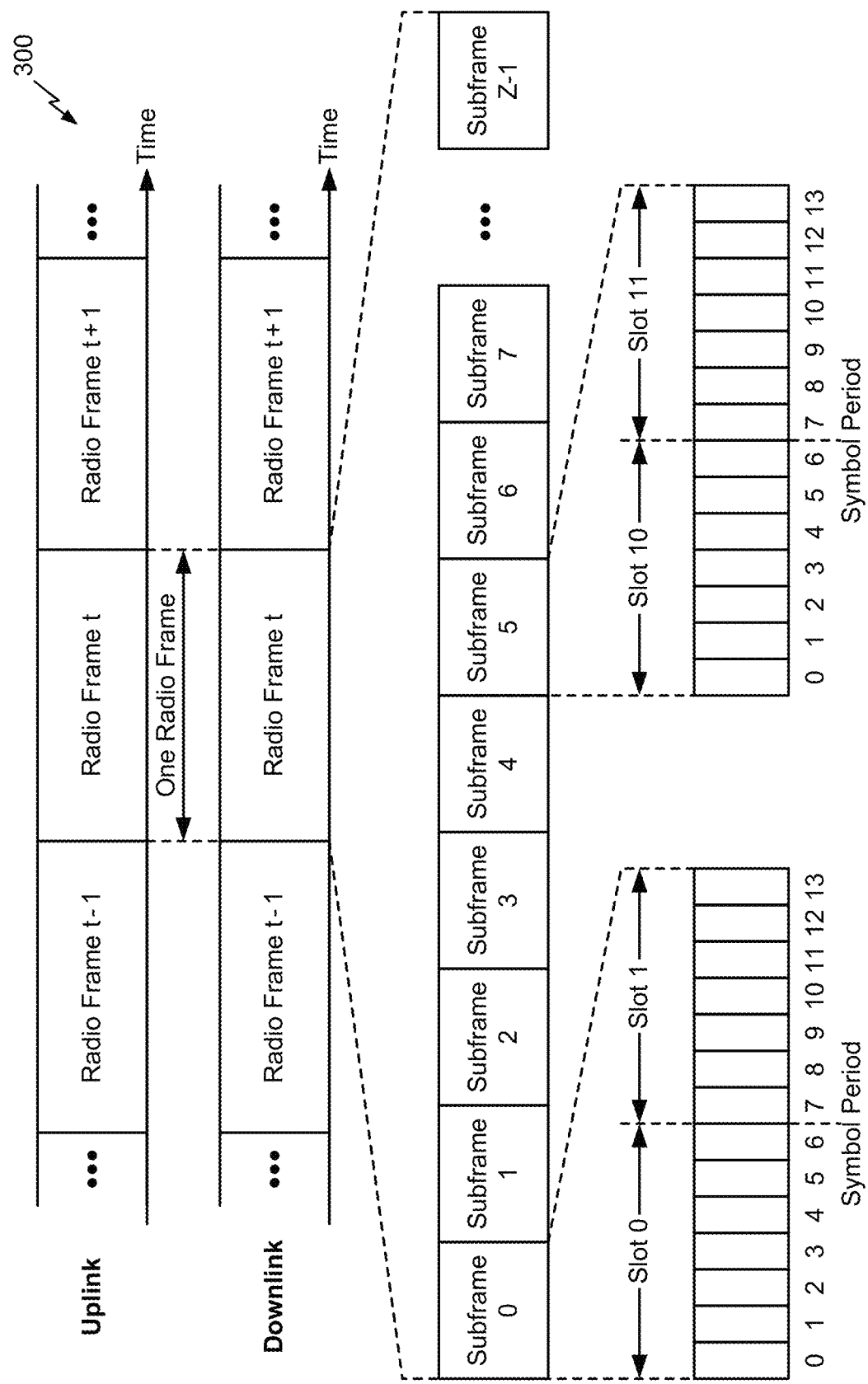
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
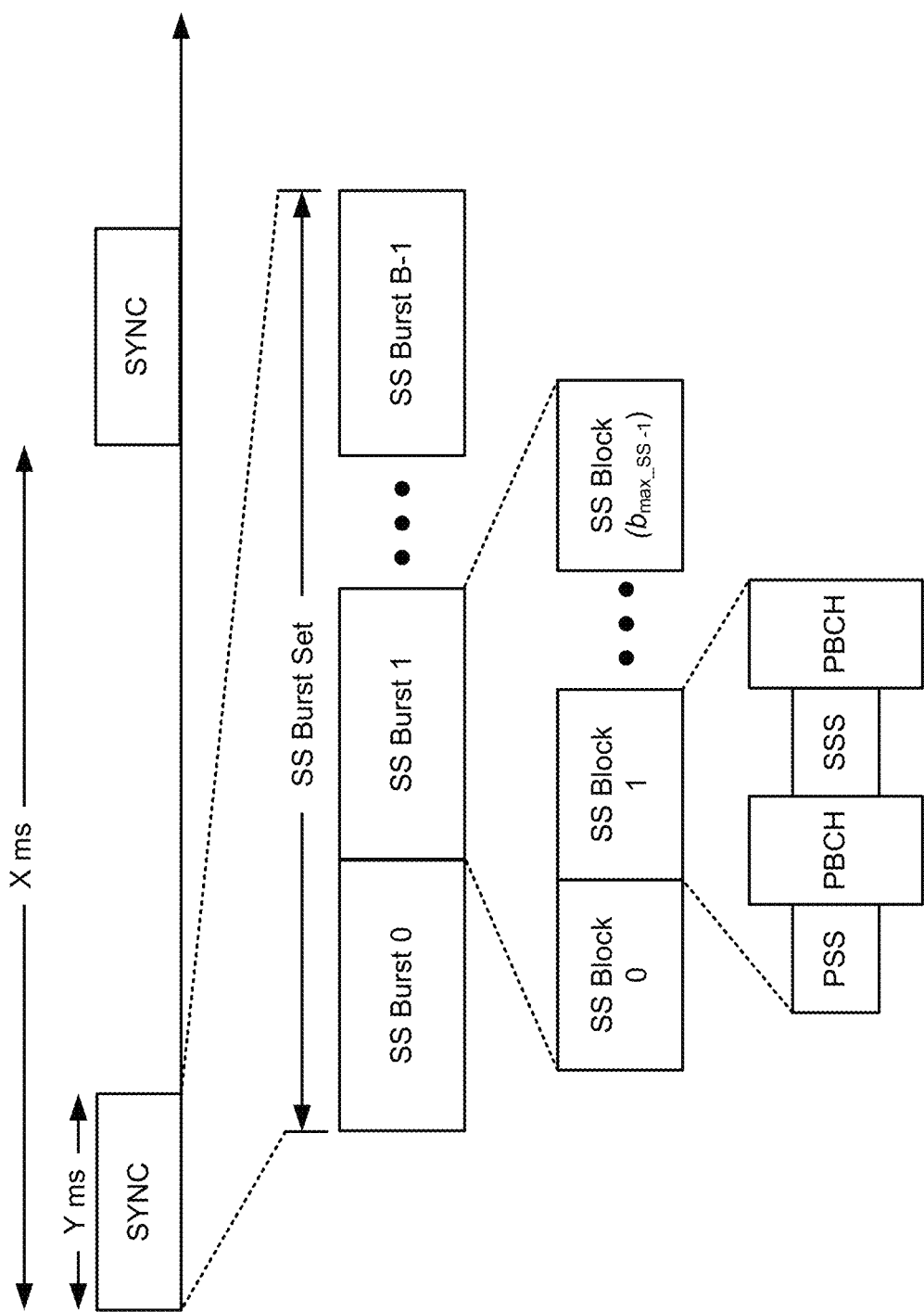
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
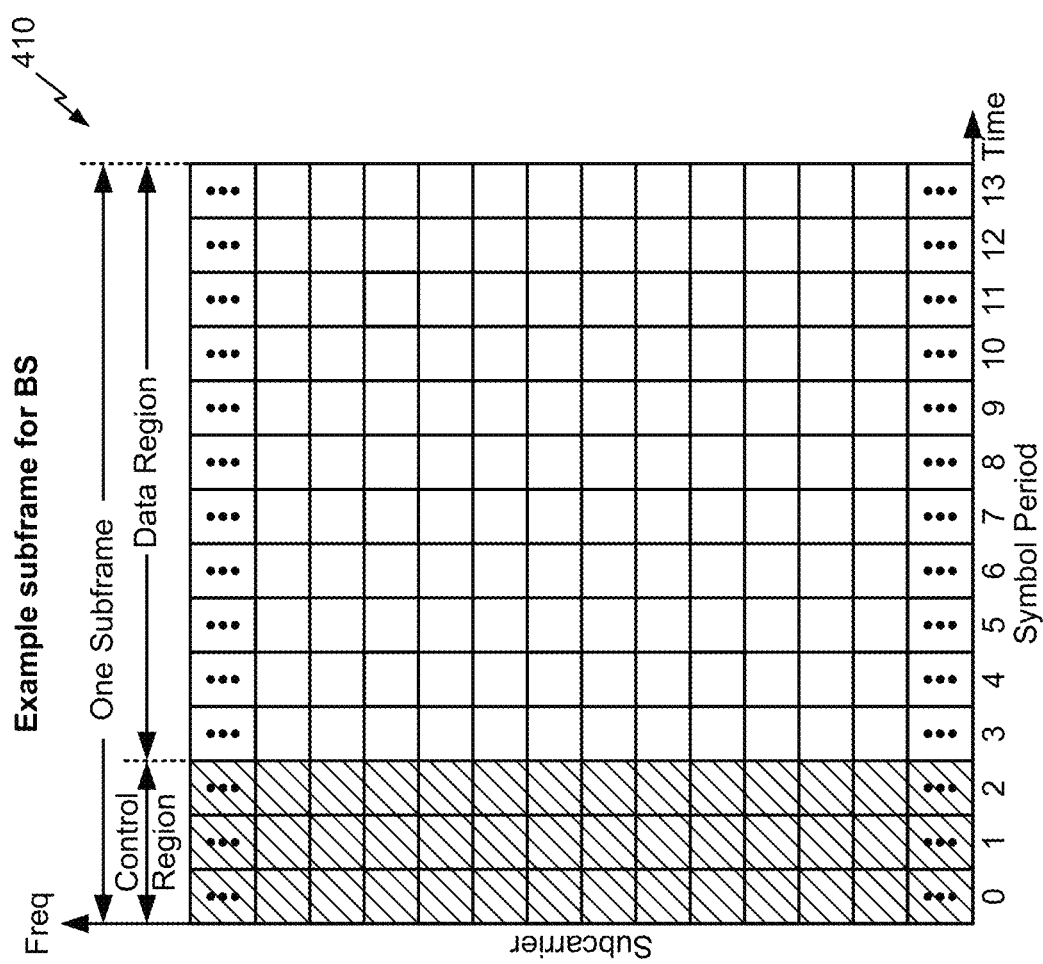
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
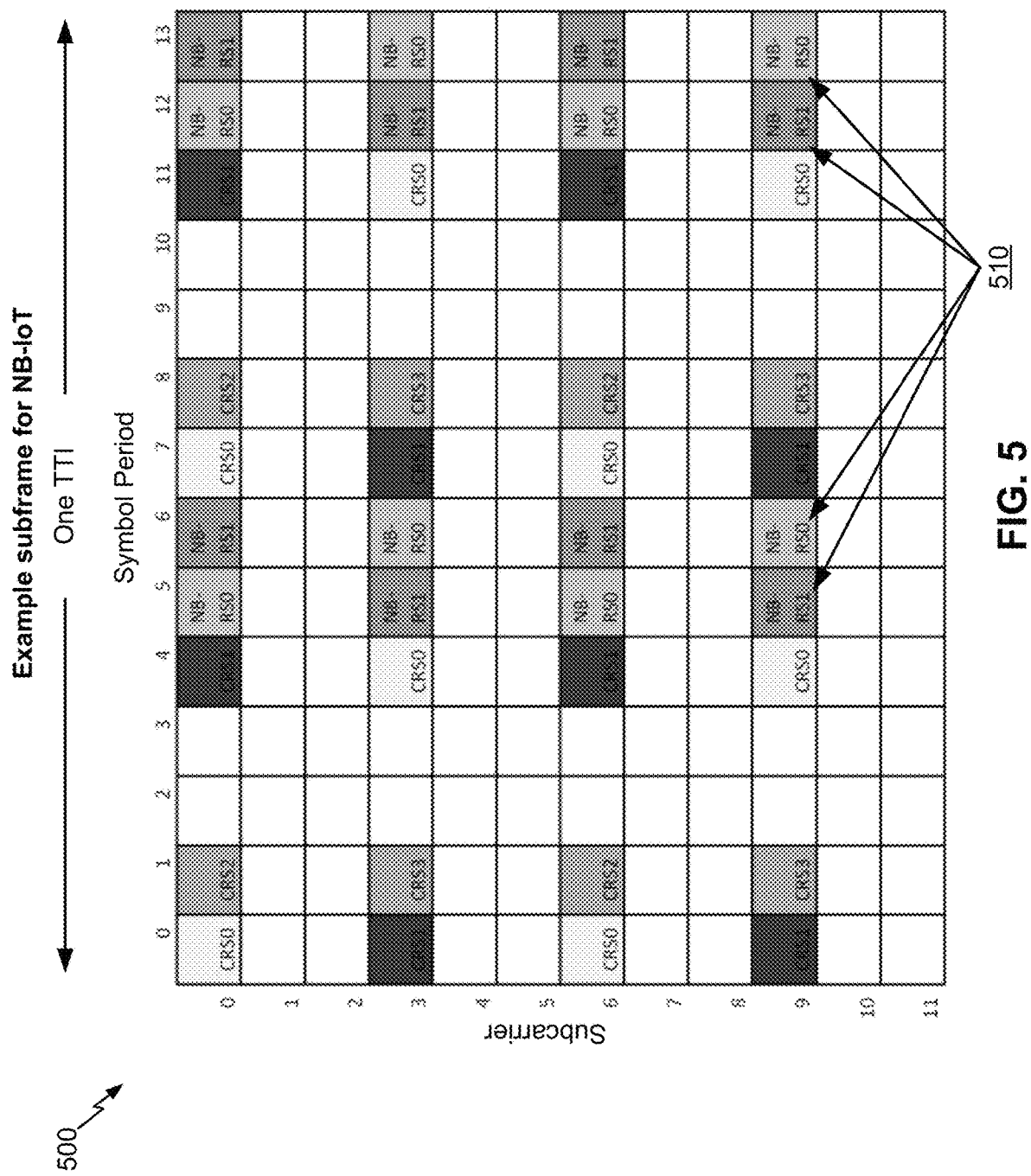
FIG. 5 is a diagram of an example narrowband Internet of Things (NB-IoT) resource block, in accordance with various aspects of the present disclosure.

FIG. 5 is a diagram of an example NB-IoT resource block 500, in accordance with various aspects of the present disclosure.

As shown, time and frequency resources may be partitioned into resource blocks. A resource block may cover a set of subcarriers (e.g., 12 subcarriers) in one transmission time interval (TTI) (e.g., a subframe, a slot, and/or the like), and may include a number of resource elements. A resource element may cover one subcarrier in one symbol period (e.g., in time) and may be used to send one modulation symbol, which may be a real or complex value. In some aspects, the TTI may be a subframe that includes two slots, and each slot may include 7 symbols. In this case, the TTI may have a duration of 14 symbols. In some aspects, in NB-IoT, each resource element may span 15 kHz of bandwidth, and a resource block may span 180 kHz of bandwidth. In this way, NB-IoT may be flexibly deployed using a small portion of existing radio frequency spectrum (e.g., by replacing a GSM carrier with an NB-IoT carrier, by deploying an NB-IoT carrier inside an LTE carrier, by deploying NB-IoT in the guard band of an LTE carrier, and/or the like).

In NB-IoT, a frame may include 10 subframes, labeled 0 through 9. In some aspects, subframe 0 may be used for NPBCH communications in every NB-IoT frame, subframe 5 may be used for narrowband PSS (NPSS) communications in every NB-IoT frame, and subframes 1 through 4 and 6 through 8 may be used for NPDCCH and/or NPDSCH communications in every NB-IoT frame. In even-numbered NB-IoT frames, subframe 9 may be used for narrowband SSS (NSSS) communications, and in odd-numbered NB-IOT frames, subframe 9 may be used for NPDCCH and/or NPDSCH communications.

In NB-IoT, a UE 120 (e.g., an NB-IoT UE) may estimate power of a received signal using a narrowband reference signal received power (NRSRP) parameter, similar to an RSRP parameter in LTE, 5G, and/or the like. The UE 120 may use the NRSRP parameter to perform cell reselection, such as by performing a handover procedure from a serving cell to a neighbor cell associated with an NRSRP parameter that satisfies a threshold. In some aspects, the UE 120 may measure narrowband reference signals (NRSs) to estimate the NRSRP parameter. An NRS may be used to provide phase reference for demodulation of downlink channels, and may be multiplexed in time and frequency with information-bearing symbols in subframes carrying NPBCH signals, narrowband PDCCH (NPDCCH) signals, and/or narrowband PDSCH (NPDSCH) signals, using 8 resource elements per subframe per antenna port.

However, in some cases, NRSs may be transmitted and received relatively infrequently, and may be sparse in time. For example, as shown by reference number 510, NRSs (e.g., shown as NB-RS0 and NB-RS1) may only be transmitted in symbols 5, 6, 12, and 13 of a subframe. Furthermore, if the UE 120 has not received or decoded a system information block (SIB) (e.g., SIB1) for a cell, such as a neighbor cell, then the UE 120 may be configured to monitor for NRSs only on subframes 0, 4, and 9 of a frame (e.g., in 3 out of 10 subframes of the frame). Furthermore, the UE 120 may be configured to monitor for NRSs on subframe 9 only on odd-numbered frames, because subframe 9 may carry an NSSS in subframe 9 in even-numbered frames.

To accurately estimate an NRSRP parameter, an NB-IoT UE 120 may need to measure a large number of NRSs (e.g., across 40 subframes or more), particularly when the NB-IoT UE 120 is deployed in a deep coverage scenario, such as near a cell edge and/or in a location with poor cell coverage (e.g., less than 0 dB, less than −5 dB, and/or the like). Because the NRSs are received infrequently, this may require the NB-IoT UE 120 to stay awake (e.g., in an ON duration of a discontinuous reception (DRX) cycle) for a long time period (e.g., 5 subframes, 20 subframes, 40 subframes, or more), to measure enough NRSs for an accurate estimation of the NRSRP parameter (e.g., using NRS averaging). This may cause a battery of the NB-IoT UE 120 to drain quickly, particularly when the NB-IoT UE 120 estimates NRSRP parameters for multiple neighbor cells. Some techniques and apparatuses described herein conserve battery power of NB-IoT UEs 120 by, for example, using an NPBCH signal power to estimate an NRSRP parameter, indicating presence or absence of NRSs in all subframes of a frame, and/or the like.

As indicated above, FIG. 5 is provided as an example. Other examples may differ from what is described with regard to FIG. 5.

Figure 6:
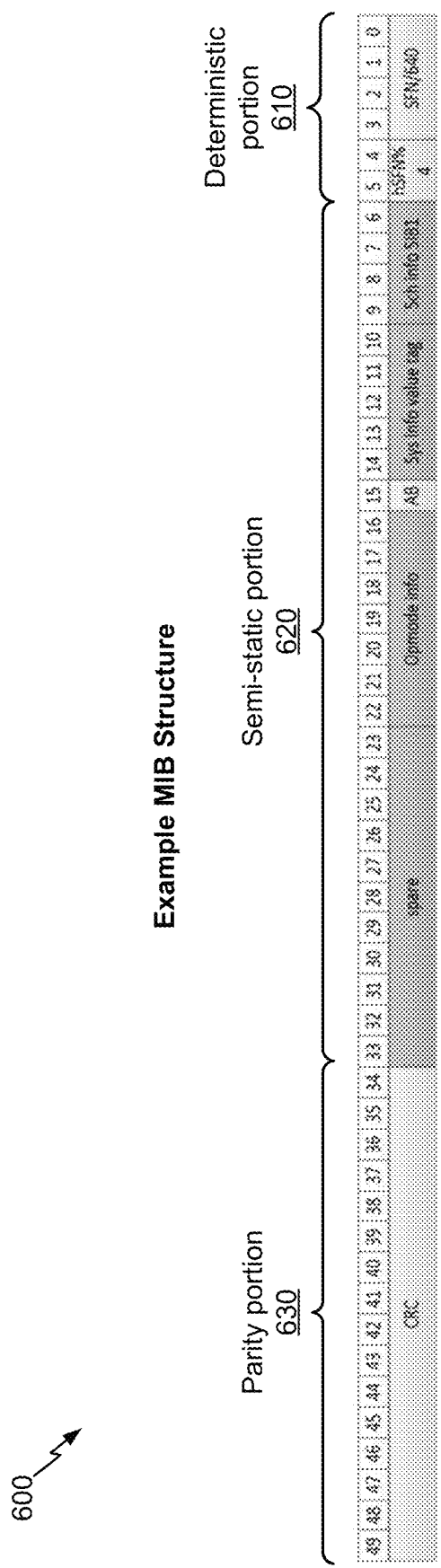
FIG. 6 is a diagram of an example master information block (MIB) structure, in accordance with various aspects of the present disclosure.

FIG. 6 is a diagram of an example master information block (MIB) structure 600, in accordance with various aspects of the present disclosure.

As described in more detail elsewhere herein, a UE 120 (e.g., an NB-IoT UE) may determine an NPBCH signal power, and may use the NPBCH signal power to estimate an NRSRP parameter, which may conserve battery power of the UE 120. For example, the NPBCH signal power, with which an NPBCH signal is transmitted and/or received, may be the same as an NRS power with which an NRS is transmitted and/or received. Alternatively, the NPBCH signal power and the NRS power may differ by an amount (e.g., according to a ratio) capable of being determined by the UE 120.

In NB-IoT, the NPBCH may be transmitted in subframe 0 of every frame, may include 100 symbols per subframe, and may carry a master information block (MIB). As shown, the MIB may include a deterministic portion 610 that changes across MIBs according to a known pattern. For example, the deterministic portion 610 may indicate a system frame number (SFN), a hyper SFN (hSFN), and/or the like, which may, for example, be incremented by a value of 1 across successive MIBs. As further shown, the MIB may include a semi-static portion 620 that includes contents that are the same across multiple MIBs and change relatively infrequently (e.g., once per 30 minutes, once per hour, and/or the like). For example, the semi-static portion 620 may indicate scheduling information for a SIB (e.g., SIB1), a system information value tag, an operation mode, and/or the like, and/or may include reserved or spare bits. As further shown, the MIB may include a parity portion 630 that includes one or more parity bits used for a parity check (e.g., a cyclic redundancy check (CRC) and/or the like). The parity portion 630 may change deterministically with the changes to the deterministic portion 610.

Because contents of the MIB change infrequently and/or change according to a predetermined pattern, the UE 120 may decode a MIB, and may use the decoded contents to generate (e.g., reconstruct) reference MIBs corresponding to later-received MIBs. Upon receiving a later MIB on the NPBCH, the UE 120 may compare a reference MIB to the received MIB to estimate an RSRP parameter for the NPBCH, and may use the estimated RSRP parameter for the NPBCH to estimate an NRSRP parameter for NRSs. In this way, the UE 120 may reduce a wake time (e.g., in a DRX cycle) by avoiding or supplementing NRS measurements to determine an NRSRP parameter, thereby conserving battery power of the UE 120.

As indicated above, FIG. 6 is provided as an example. Other examples may differ from what is described with regard to FIG. 6.

Figure 7:
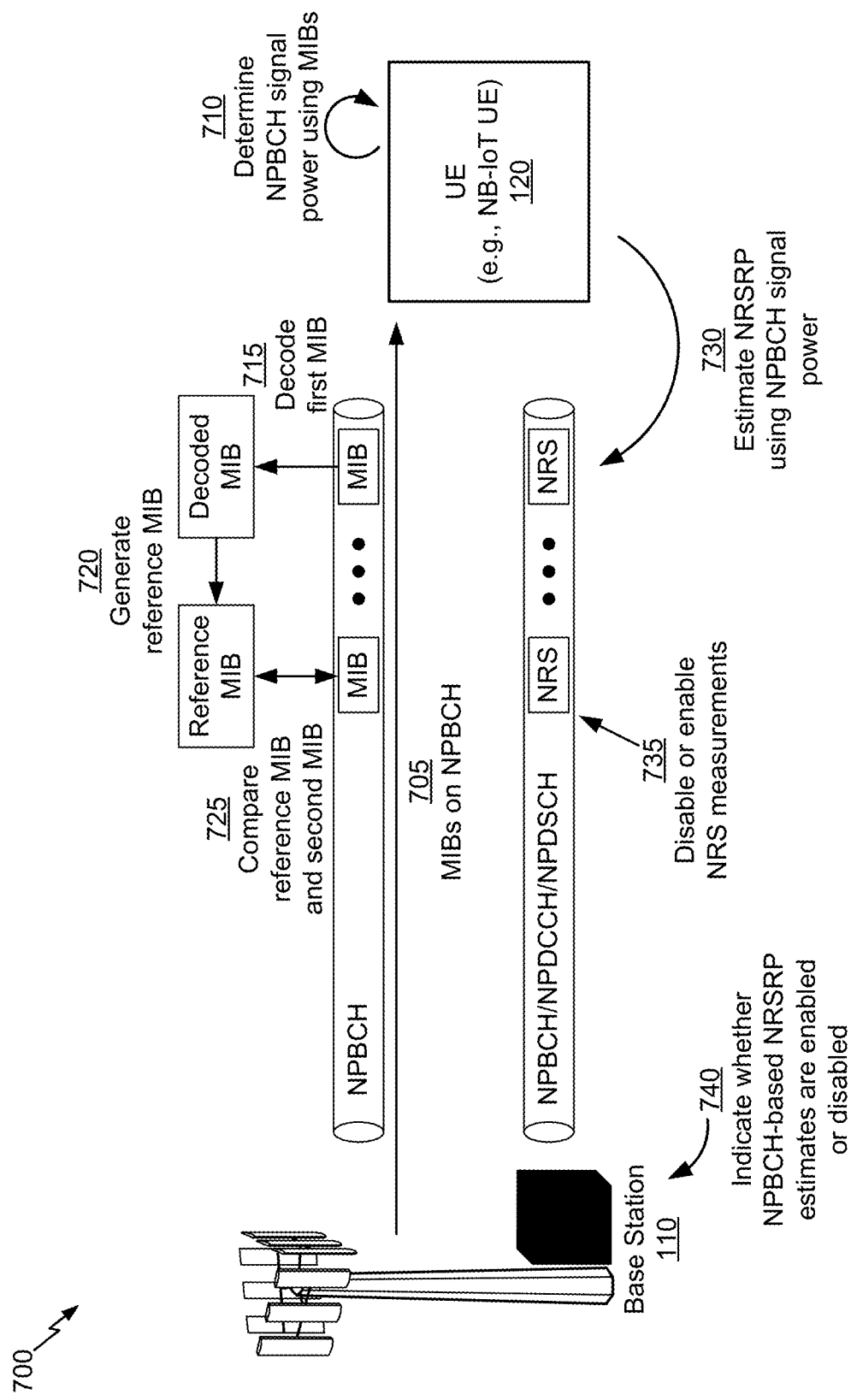
FIGS. 7-9 are diagrams illustrating examples of estimating an NRSRP parameter, in accordance with various aspects of the present disclosure.

FIG. 7 is a diagram illustrating an example 700 of estimating an NRSRP parameter, in accordance with various aspects of the present disclosure.

As shown in FIG. 7, a base station 110 and a UE 120 (e.g., an NB-IoT UE) may communicate with one another, such as via an NB-IoT carrier, described above in connection with FIG. 5. As shown by reference number 705, the base station 110 may transmit, and the UE 120 may receive, a plurality of MIBs on an NPBCH. For example, the base station 110 may transmit, and the UE 120 may receive, the MIBs in subframe 0 of every NB-IoT frame.

As shown by reference number 710, the UE 120 may determine an NPBCH signal power based at least in part on the plurality of MIBs. In some aspects, the NPBCH signal power may be represented as an RSRP parameter for an NPBCH signal (e.g., a signal that includes a MIB), and may be calculated as a correlation between a reference MIB and a received MIB.

For example, as shown by reference number 715, the UE 120 may decode a first MIB (e.g., received earlier in time than a second MIB). As shown by reference number 720, the UE 120 may generate a reference MIB using the first MIB. For example, the UE 120 may generate a deterministic portion 610 of the reference MIB using the first MIB and a predetermined pattern (e.g., by incrementing a bit counter that represents an SFN, an hSFN, and/or the like), may generate a semi-static portion 620 of the reference MIB to be the same as the semi-static portion 620 of the first MIB, may generate a parity portion 630 of the reference MIB such that the deterministic portion 610 and the semi-static portion 620 of the reference MIB pass a CRC, and/or the like. As shown by reference number 725, the UE 120 may compare the reference MIB and a second MIB (e.g., received later in time than the first MIB).

As shown by reference number 730, the UE 120 may estimate an NRSRP parameter based at least in part on the NPBCH signal power. In some aspects, the UE 120 may determine a correlation value based at least in part on comparing the reference MIB and the second MIB, and may estimate the NRSRP parameter using the correlation value. In some aspects, the UE 120 may non-coherently accumulate multiple correlation values determined across multiple frames (e.g., by generating multiple reference MIBs and comparing the reference MIBs to corresponding received MIBs). In some aspects, the UE 120 may estimate the NRSRP parameter using an accumulated correlation value if the accumulated correlation value (e.g., a correlation peak) satisfies a threshold, indicating that the accumulated correlation value has converged. In some aspects, the number of MIBs used to determine the NRSRP parameter (e.g., the number of MIBs required for convergence of the accumulated correlation value) may depend on a SINR for the PBCH. For example, a greater number of MIBs may be used for a lower SINR value, and a lesser number of MIBs may be used for a higher SINR value.

In some aspects, the UE 120 may set the NRSRP parameter to be equal to the accumulated correlation value and/or may map the accumulated correlation value to the NRSRP parameter, such as when the NPBCH signal power, with which an NPBCH signal is transmitted and/or received, is the same as an NRS power with which an NRS is transmitted and/or received. In some aspects, the NPBCH signal power and the NRS power may differ by an amount (e.g., according to a ratio) capable of being determined by the UE 120. In this case, the UE 120 may estimate the NRSRP parameter using the NPBCH signal power and a ratio between the NPBCH signal power and a signal power associated with the set of narrowband reference signals (NRS). For example, the UE 120 may determine the ratio by comparing a converged PBCH signal power and a converged NRS signal power, and may calculate the NRSRP parameter by applying the ratio to the determined NPBCH signal power.

In some aspects, the UE 120 may estimate the NRSRP parameter for a serving cell using NPBCH signal power of the serving cell. Additionally, or alternatively, the UE 120 may estimate the NRSRP parameter for a neighbor cell using NPBCH signal power of the neighbor cell. Additionally, or alternatively, the UE 120 may estimate a plurality of NRSRP parameters, for a corresponding plurality of neighbor cells, based at least in part on a plurality of NPBCH signal powers corresponding to the plurality of neighbor cells. In this way, the UE 120 may conserve battery power associated with performing NRSRP measurements on multiple neighbor cells.

In some aspects, the UE 120 may estimate the NRSRP parameter using the NPBCH signal power based at least in part on determining that semi-static content of the MIB (e.g., in a semi-static portion 620 of the MIB) has not changed (e.g., from one MIB to the next MIB). In some aspects, the UE 120 may estimate the NRSRP parameter using the set of NRS (e.g., and not using the NPBCH signal power) based at least in part on determining that semi-static content of the MIB has changed (e.g., from one MIB to the next MIB). In this case, the UE 120 may use the set of NRS to estimate the NRSRP parameter until a new correlation value, associated with the plurality of MIBs, converges. For example, the UE 120 may obtain and decode a MIB with the changed contents, may generate a reference MIB from the MIB with the changed contents, may compare the reference MIB to a later MIB, and/or the like, in a similar manner as described above in connection with reference numbers 715-725.

As shown by reference number 735, in some aspects, the UE 120 may disable NRS measurements based at least in part on determining that the accumulated correlation value has converged and thus NPBCH signal power can be used to estimate the NRSRP parameter. In this case, the UE 120 may determine the NRSRP parameter using only the NPBCH signal power and not a signal power determined for the set of NRS. In this way, using the NPBCH signal power to estimate the NRSRP parameter may reduce a DRX cycle wake time and/or an NRSRP measurement period for the UE as compared to estimating the NRSRP parameter using only the set of NRS. Furthermore, battery power of the UE 120 may be conserved (e.g., due to the shorter DRX cycle wake time and/or fewer NRS measurements) by disabling NRS measurements.

Alternatively, the UE 120 may keep NRS measurements enabled, and may use the NPBCH signal power to supplement an NRS-based estimation of NRSRP. In this case, the UE 120 may determine the NRSRP parameter using both the NPBCH signal power and a signal power determined for the set of NRS. In some aspects, presence or absence of the set of NRS in one or more subframes of a frame (e.g., in all subframes of a frame) may be indicated to the UE 120 by the base station 110. This may reduce a number of NRS measurements needed to determine NRSRP, thereby conserving battery power of the UE 120. Additionally, or alternatively, supplementing NRS-based estimation of NRSRP with an NPBCH-based estimation of NRSRP may increase an accuracy of the determined NRSRP parameter.

As shown by reference number 740, in some aspects, the base station 110 may transmit, and the UE 120 may receive, an indication of whether NPBCH-based NRSRP estimates are to be enabled or disabled (e.g., whether the UE 120 is to use the NPBCH signal power to estimate the NRSRP parameter). If the base station 110 indicates that NPBCH-based NRSRP estimates are enabled for the UE 120, then the UE 120 may estimate the NRSRP parameter using the NPBCH signal power. If the base station 110 indicates NPBCH-based NRSRP estimates are disabled for the UE 120, then the UE 120 may estimate the NRSRP parameter using the set of NRS.

In some aspects, the indication may be included in a MIB of the plurality of MIBs transmitted and/or received via the NPBCH. In some aspects, the indication may be included in a system information block (SIB) associated with a cell. In some aspects, the cell may be a serving cell. In some aspects, the cell may be a neighbor cell. The indication may indicate, for example, whether NPBCH-based NRSRP estimates are enabled or disabled for the cell, whether NPBCH-based NRSRP estimates are enabled or disabled for one or more neighbor cells of the cell, whether NPBCH-based NRSRP estimates are enabled or disabled for all intra-band cells, whether NPBCH-based NRSRP estimates are enabled or disabled for all cells, and/or the like.

In some aspects, the base station 110 may determine whether to enable or disable NPBCH-based estimates of the NRSRP parameter for a UE 120, and may transmit the indication based at least in part on the determination. In some aspects, the determination may be based at least in part on a relative power between NPBCH transmissions and NRS transmissions. For example, if the relative power (e.g., a ratio or a difference) between NPBCH transmissions and NRS transmissions is greater than or equal to a threshold, then the base station 110 may determine to disable NPBCH-based estimates of the NRSRP parameter. In this way, the base station 110 may assist the UE 120 in avoiding inaccurate NRSRP estimates. Otherwise, the base station 110 may enable NPBCH-based estimates.

Additionally, or alternatively, the determination may be based at least in part on a frequency with which content (e.g., semi-static content) of a MIB changes. For example, if MIB content changes frequently (e.g., with a frequency or at a rate that is greater than or equal to a threshold), then the base station 110 may determine to disable NPBCH-based estimates because UE power savings associated with NPBCH-based estimates may be reduced or eliminated if the MIB content changes often. Otherwise, the base station 110 may enable NPBCH-based estimates.

As indicated above, FIG. 7 is provided as an example. Other examples may differ from what is described with regard to FIG. 7.

Figure 8:
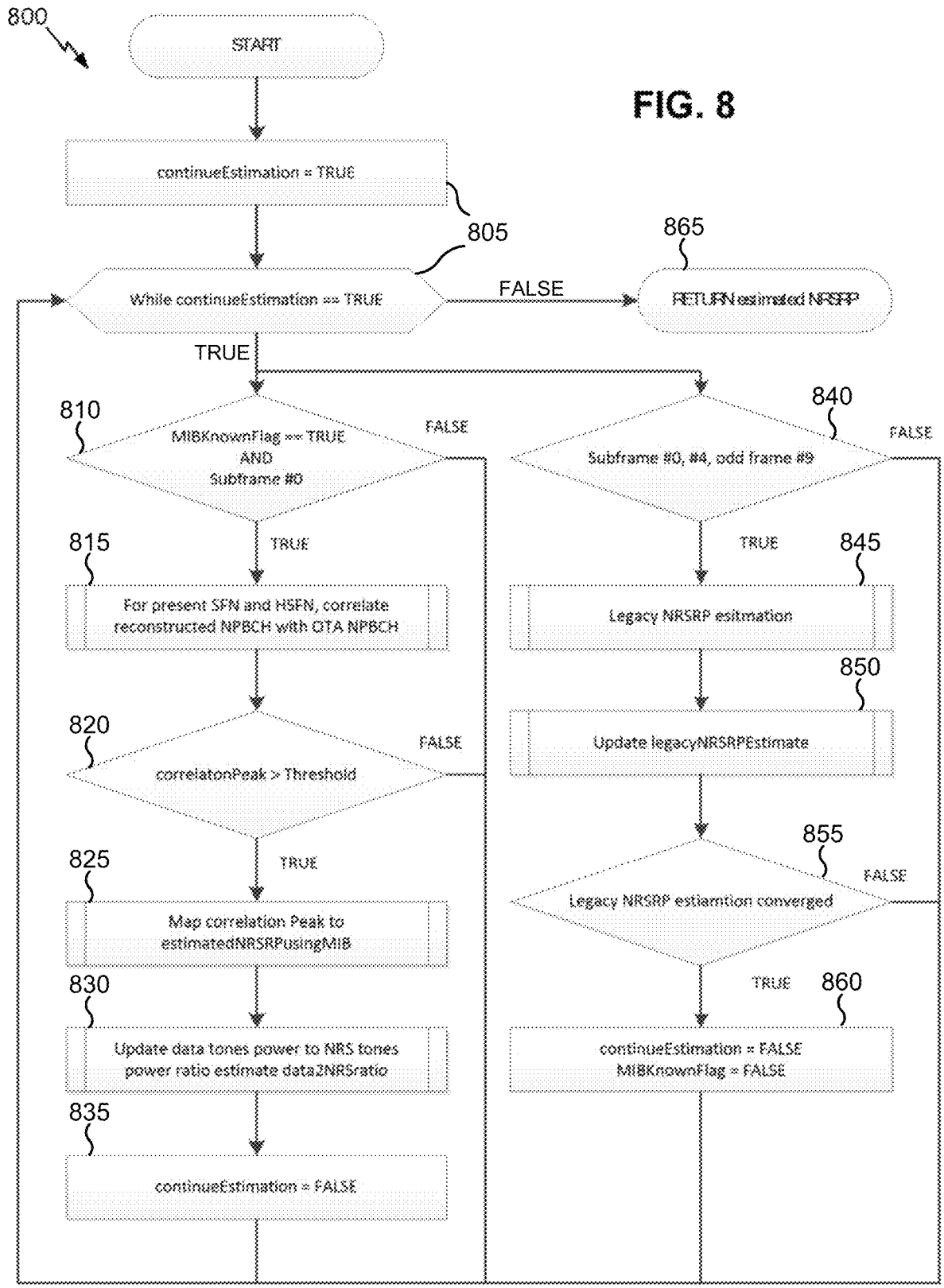

FIG. 8 is a diagram illustrating another example 800 of estimating an NRSRP parameter, in accordance with various aspects of the present disclosure. Example 800 shows example operations that may be performed by a UE 120 in association with estimating an NRSRP parameter.

As shown by reference number 805, the UE 120 may set an estimation flag (e.g., shown as continueEstimation) to True, and may perform one or more processes to estimate an NRSRP parameter (e.g., using averaging over a time window) when the estimation flag is set to True. In some aspects, the UE 120 may perform parallel processes (e.g., simultaneously and/or concurrently) associated with NPBCH-based estimation of the NRSRP parameter (e.g., shown by reference numbers 810-835) and NRS-based estimation of the NRSRP parameter (e.g., shown by reference numbers 840-860).

As shown by reference number 810, the UE 120 may receive and decode a first MIB, and may set a MIB known flag (e.g., shown as MIBKnownFlag) to True based at least in part on decoding the first MIB (e.g., once the contents of the MIB are determined by the UE 120). The UE 120 may then receive another MIB in a later frame (e.g., in subframe 0 of the late frame). If the contents of the MIB are not known or the current subframe is not subframe 0, then the UE 120 may wait until the contents of the MIB are known and the current subframe is subframe 0 before proceeding with NPBCH-based estimation of the NRSRP parameter.

As shown by reference number 815, the UE 120 may generate a reference MIB, using the current SFN and hSFN, from the first MIB, and may correlate the reference MIB (e.g., shown as reconstructed NPBCH) with a MIB received after the first MIB (e.g., shown as over-the-air (OTA) NPBCH). The UE 120 may non-coherently accumulate correlated MIBs (e.g., reference MIBs and received MIBs) for multiple frames.

As shown by reference number 820, the UE 120 may determine whether a correlation peak (e.g., a peak correlation energy), associated with the non-coherently accumulated MIBs, satisfies a threshold. If the correlation peak does not satisfy the threshold, then the UE 120 may continue to receive MIBs and non-coherently accumulate the MIBs.

As shown by reference number 825, if the correlation peak satisfies the threshold, then the UE 120 may map the correlation peak to an estimate of the NRSRP parameter, such as by adjusting the correlation peak, using a previously determined ratio, to estimate the NRSRP parameter. As shown by reference number 830, the UE 120 may update the ratio between NPBCH signal power and NRS signal power. As shown by reference number 835, the UE 120 may set the estimation flag to False, and may return the NRSRP parameter estimated using the correlation peak (e.g., using NPBCH-based estimation). For example, the UE 120 may store the NRSRP parameter in association with a cell, may use the NRSRP parameter to determine whether to request and/or perform a handover, and/or the like.

As shown by reference number 840, the UE 120 may determine whether the current subframe is subframe 0, subframe 4, or subframe 9 in an odd-numbered frame. If the current subframe is not subframe 0, subframe 4, or subframe 9 in an odd-numbered frame, then the UE 120 may wait until the current subframe is subframe 0, subframe 4, or subframe 9 in an odd-numbered frame before proceeding with legacy NRSRP estimation (e.g., NRS-based estimation of the NRSRP parameter).

As shown by reference number 845, if the current subframe is subframe 0, subframe 4, or subframe 9 in an odd-numbered frame, then the UE 120 may perform legacy NRSRP estimation. For example, the UE 120 may combine the measured NRS in the current subframe with previous NRS measurements (e.g., using accumulation), and may perform NRS averaging to estimate the NRSRP parameter. As shown by reference number 850, the UE 120 may update the estimate of the NRSRP parameter using the NRS received in the current subframe.

As shown by reference number 855, the UE 120 may determine whether the legacy NRSRP estimate has converged. If the legacy NRSRP estimate has not converged, then the UE 120 may continue to receive NRS and perform NRS averaging (e.g., concurrently with performing NPBCH-based estimation) until the legacy NRSRP estimate converges. In some aspects, the NPBCH-based estimate may converge before the legacy NRSRP estimate (e.g., when the correlation peak satisfies the threshold). In this case, the UE 120 may disable NRS measurements in some aspects (e.g., may stop performing the process described in connection with reference numbers 840-860), as described elsewhere herein.

As shown by reference number 860, if the legacy NRSRP estimate has converged, then the UE 120 may set the estimation flag to False, and may return the NRSRP parameter estimated using legacy NRSRP estimation (e.g., using NRS-based estimation). For example, the UE 120 may store the NRSRP parameter in association with a cell, may use the NRSRP parameter to determine whether to request and/or perform a handover, and/or the like. Additionally, or alternatively, the UE 120 may set the MIB known flag to False. For example, because the NRS-based estimation converged before the PBCH-based estimation, this may indicate that content of the MIB has changed. In this case, the UE 120 may obtain and decode a MIB with the changed content, and may use that MIB to perform NPBCH-based estimation, as described elsewhere herein. In this way, the UE 120 may fall back to legacy NRSRP estimation when NPBCH-based estimation fails or takes a long time to converge due to a change in MIB content. After accounting for the changed MIB content, the UE 120 may resume NPBCH-based estimation to conserve battery power.

As indicated above, FIG. 8 is provided as an example. Other examples may differ from what is described with regard to FIG. 8.

Figure 9:
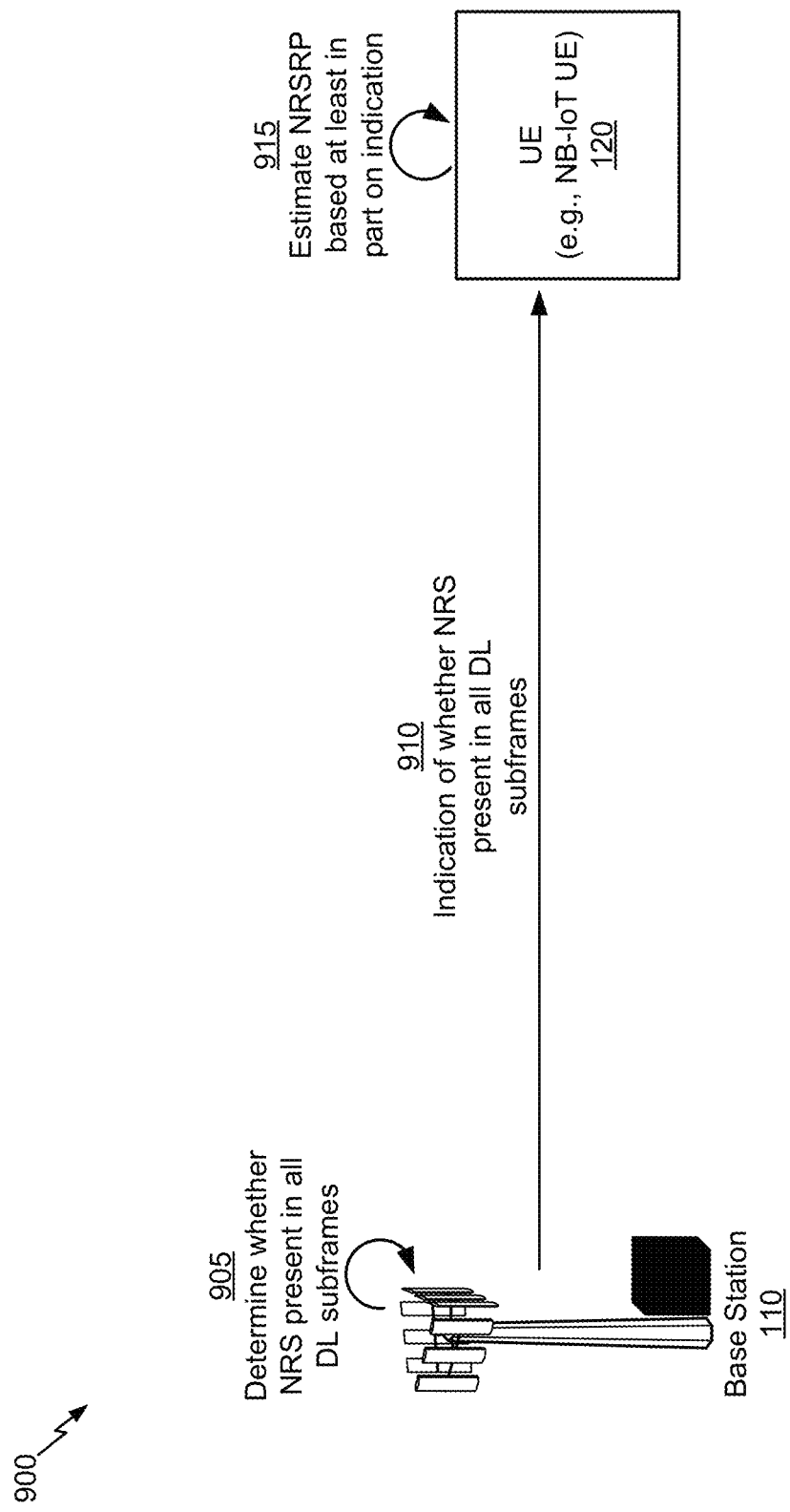

FIG. 9 is a diagram illustrating another example 900 of estimating an NRSRP parameter, in accordance with various aspects of the present disclosure.

As shown in FIG. 9, a base station 110 and a UE 120 (e.g., an NB-IoT UE) may communicate with one another, such as via an NB-IoT carrier, described above in connection with FIG. 5. As shown by reference number 905, the base station 110 may determine whether narrowband reference signals (NRS) are present in all downlink subframes of a frame. For example, in some cases, NRS may be present in all downlink subframes of a frame, such as any subframe that includes PBCH, PDCCH, and/or PDSCH (e.g., subframes 0-4 in every frame, subframes 6-8 in every frame, and subframe 9 in odd-numbered frames). In some aspects, the downlink subframes may exclude subframes that carry synchronization signals, such as an NPSS (e.g., in subframe 5 in every frame), NSSS (e.g., in subframe 9 in even-numbered frames), and/or the like. In some aspects, NRS may be present in all subframes (e.g., including subframes that carry synchronization signals).

As shown by reference number 910, the base station 110 may transmit, and the UE 120 may receive, an indication of whether the narrowband reference signals are present in all downlink subframes of the frame. In some aspects, the indication may be a one bit indication, which indicates that either NRS is present in all downlink subframes, or that NRS is not present in all downlink subframes. Additionally, or alternatively, the UE 120 may monitor for and/or detect presence or absence of the narrowband reference signals in all downlink subframes (e.g., in addition to or instead of receiving the indication). In this way, the UE 120 may determine presence or absence of NRS in all downlink subframes without an explicit indication from the base station 110, thereby conserving network resources.

As shown by reference number 915, the UE 120 may estimate an NRSRP parameter based at least in part on the indication. For example, if NRS is present in all downlink subframes, then the UE 120 may measure NRS in all downlink subframes, and may use the measurements to determine the NRSRP parameter, thereby reducing a wake time of the UE in a DRX cycle and/or reducing a measurement period as compared to using sparse NRS measurements to determine the NRSRP parameter. In some aspects, if NRS is present in all downlink subframes, then the UE 120 may disable NPBCH-based estimates of the NRSRP parameter, and may enable NRS-based estimates of the NRSRP parameter. Alternatively, the UE 120 may use NPBCH-based estimates to improve the accuracy of NRS-based estimates.

In some aspects, if NRS is not present in all downlink subframes, then the UE 120 may enable NPBCH-based estimates, and may disable NRS-based estimates (e.g., after the NPBCH-based estimate converges and/or as long as the MIB contents remain unchanged). In this way, the UE 120 may conserve battery power used to estimate the NRSRP parameter.

As indicated above, FIG. 9 is provided as an example. Other examples may differ from what is described with regard to FIG. 9.

Figure 10:
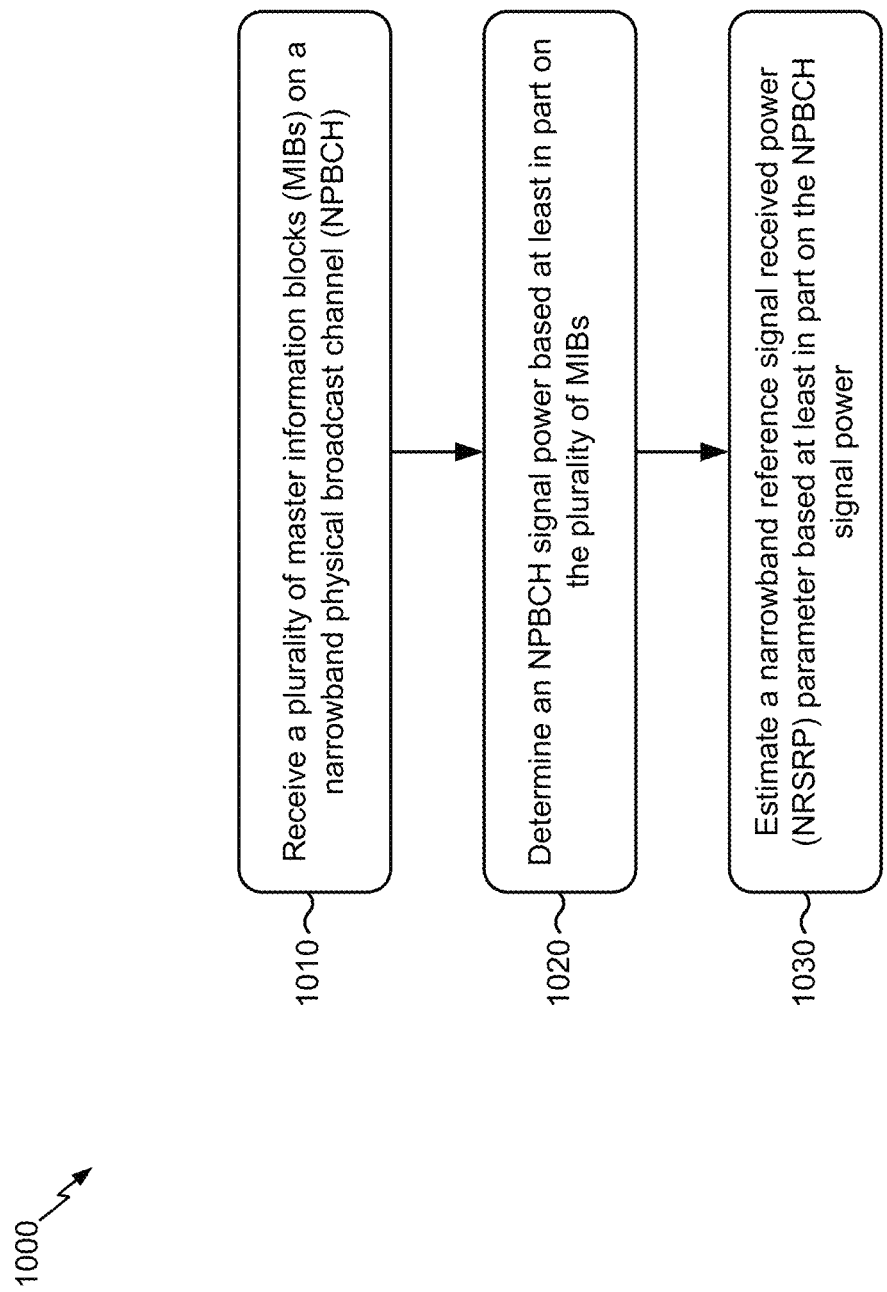

FIG. 10 is a diagram illustrating an example process 1000 performed, for example, by a UE, in accordance with various aspects of the present disclosure. Example process 1000 is an example where a UE (e.g., UE 120 and/or the like) performs operations associated with NRSRP parameter estimation.

As shown in FIG. 10, in some aspects, process 1000 may include receiving a plurality of master information blocks (MIBs) on a narrowband physical broadcast channel (NPBCH) (block 1010). For example, the UE may receive (e.g., using antenna 252, DEMOD 254, MIMO detector 256, receive processor 258, controller/processor 280, and/or the like) a plurality of MIBs on an NPBCH, as described above in connection with FIGS. 7 and 8.

As further shown in FIG. 10, in some aspects, process 1000 may include determining an NPBCH signal power based at least in part on the plurality of MIBs (block 1020).

For example, the UE may determine (e.g., using controller/processor 280 and/or the like) an NPBCH signal power based at least in part on the plurality of MIBs, as described above in connection with FIGS. 7 and 8.

As further shown in FIG. 10, in some aspects, process 1000 may include estimating a narrowband reference signal received power (NRSRP) parameter based at least in part on the NPBCH signal power (block 1030). For example, the UE may estimate (e.g., using controller/processor 280 and/or the like) an NRSRP parameter based at least in part on the NPBCH signal power, as described above in connection with FIGS. 7 and 8. In some aspects, the UE may estimate the NRSRP parameter for a set of narrowband reference signals.

Process 1000 may include additional aspects, such as any single aspect or any combination of aspects described below.

In some aspects, using the NPBCH signal power reduces at least one of a discontinuous reception (DRX) cycle wake time or an NRSRP measurement period for the UE as compared to estimating the NRSRP parameter using only the set of NRS. In some aspects, determining the NPBCH signal power comprises: decoding a first MIB of the plurality of MIBs; generating a reference MIB using the decoded first MIB; and comparing the reference MIB and a second MIB of the plurality of MIBs.

In some aspects, the NRSRP parameter is estimated using the NPBCH signal power and a ratio between the NPBCH signal power and a signal power associated with the set of NRS. In some aspects, the NRSRP parameter is estimated using the NPBCH signal power based at least in part on a determination that semi-static content, included in the plurality of MIBs, has not changed. In some aspects, the UE may estimate the NRSRP parameter using the set of NRS based at least in part on a determination that semi-static content, included in the plurality of MIBs, has changed.

In some aspects, the UE may disable NRS measurements based at least in part on a determination that a correlation value associated with the plurality of MIBs satisfies a threshold. In some aspects, the NRSRP parameter is estimated using only the NPBCH signal power and not a signal power determined for the set of NRS. In some aspects, the NRSRP parameter is estimated using the NPBCH signal power and a signal power determined for the set of NRS. In some aspects, presence or absence of the set of NRS in all downlink subframes of a frame is indicated to the UE by a base station.

In some aspects, the UE may estimate the NRSRP parameter using the set of NRS based at least in part on an indication, from a base station, that NPBCH-based NRSRP estimates are disabled for the UE. In some aspects, the NRSRP parameter is estimated using the NPBCH signal power based at least in part on an indication, from a base station, that NPBCH-based NRSRP estimates are enabled for the UE. In some aspects, the UE may receive an indication, from a base station, of whether NPBCH-based NRSRP estimates are enabled or disabled for the UE. In some aspects, the indication is received in a MIB of the plurality of MIBs. In some aspects, the indication is received in a system information block (SIB) associated with a cell. In some aspects, the indication indicates at least one of: whether NPBCH-based NRSRP estimates are enabled or disabled for the cell, whether NPBCH-based NRSRP estimates are enabled or disabled for one or more neighbor cells of the cell, whether NPBCH-based NRSRP estimates are enabled or disabled for all intra-band cells, whether NPBCH-based NRSRP estimates are enabled or disabled for all cells, or some combination thereof.

In some aspects, the NRSRP parameter is estimated for a serving cell. In some aspects, the NRSRP parameter is estimated for a neighbor cell. In some aspects, a plurality of NRSRP parameters are estimated, for a corresponding plurality of neighbor cells, based at least in part on a plurality of NPBCH signal powers corresponding to the plurality of neighbor cells. In some aspects, the plurality of MIBs includes a different quantity of MIBs for different SINR values determined for the NPBCH.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
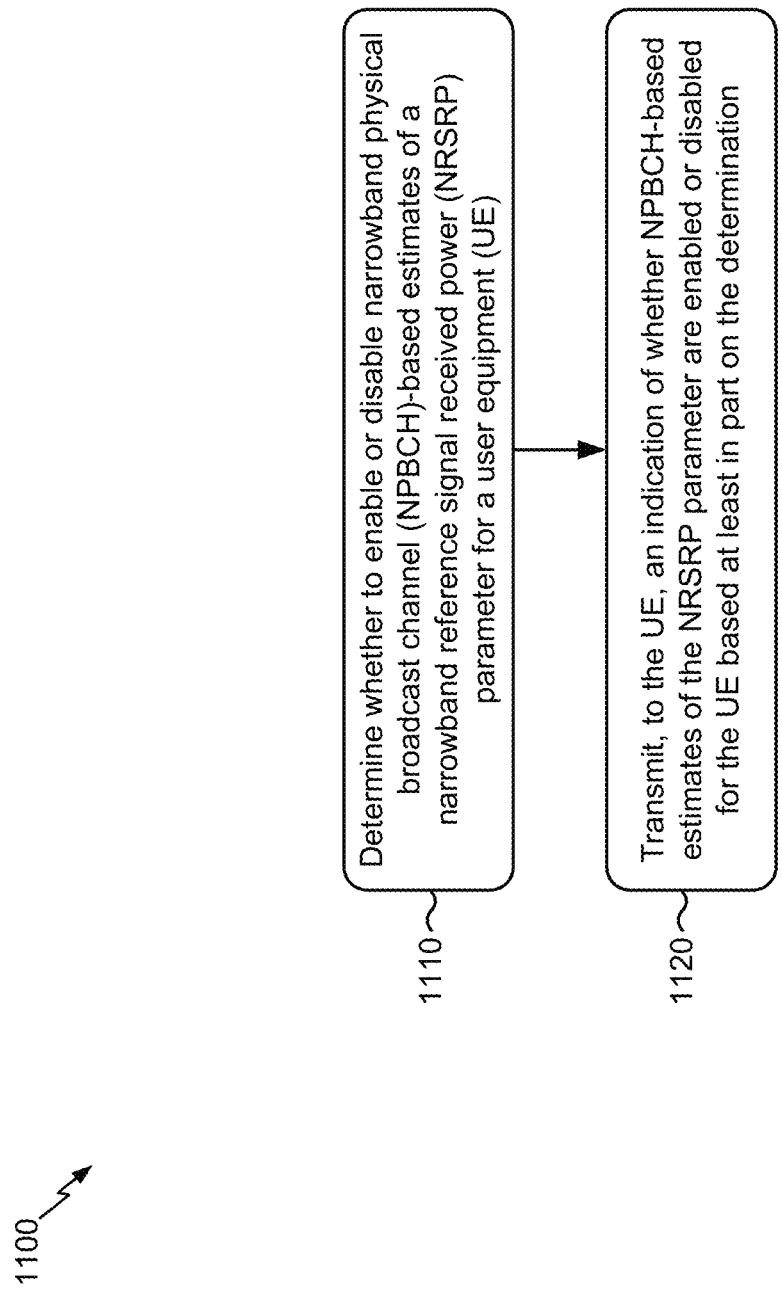

FIG. 11 is a diagram illustrating an example process 1100 performed, for example, by a base station, in accordance with various aspects of the present disclosure. Example process 1100 is an example where a base station (e.g., base station 110 and/or the like) performs operations associated with NRSRP parameter estimation.

As shown in FIG. 11, in some aspects, process 1100 may include determining whether to enable or disable narrowband physical broadcast channel (NPBCH)-based estimates of a narrowband reference signal received power (NRSRP) parameter for a user equipment (UE) (block 1110). For example, the base station may determine (e.g., using controller/processor 240 and/or the like) whether to enable or disable NPBCH-based estimates of an NRSRP parameter for a UE, as described above in connection with FIGS. 7 and 8.

As further shown in FIG. 11, in some aspects, process 1100 may include transmitting, to the UE, an indication of whether NPBCH-based estimates of the NRSRP parameter are enabled or disabled for the UE based at least in part on the determination (block 1120). For example, the base station may transmit (e.g., using controller/processor 240, transmit processor 220, TX MIMO processor 230, MOD 232, antenna 234, and/or the like), to the UE, an indication of whether NPBCH-based estimates of the NRSRP parameter are enabled or disabled for the UE based at least in part on the determination, as described above in connection with FIGS. 7 and 8.

Process 1100 may include additional aspects, such as any single aspect or any combination of aspects described below.

In some aspects, the determination is based at least in part on a relative power between NPBCH transmissions and narrowband reference signal (NRS) transmissions. In some aspects, the determination is based at least in part on a frequency with which content of a master information block (MIB) changes.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a base station, in accordance with various aspects of the present disclosure. Example process 1200 is an example where a base station (e.g., base station 110 and/or the like) performs operations associated with NRSRP parameter estimation.

As shown in FIG. 12, in some aspects, process 1200 may include determining whether narrowband reference signals are present in all downlink subframes of a frame (block 1210). For example, the base station may determine (e.g., using controller/processor 240 and/or the like) whether narrowband reference signals are present in all downlink subframes of a frame, as described above in connection with FIG. 9.

As further shown in FIG. 12, in some aspects, process 1200 may include transmitting an indication of whether the narrowband reference signals are present in all downlink subframes of the frame (block 1220). For example, the base station may transmit (e.g., using controller/processor 240, transmit processor 220, TX MIMO processor 230, MOD 232, antenna 234, and/or the like) an indication of whether the narrowband reference signals are present in all downlink subframes of the frame, as described above in connection with FIG. 9. In some aspects, the indication is a one bit indication.

Process 1200 may include additional aspects, such as any single aspect or any combination of aspects described below.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a "processor" is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a plurality of master information blocks (MIBs) on a narrowband physical broadcast channel (NPBCH);
   determining an NPBCH signal power based at least in part on the plurality of MIBs; and
   estimating a narrowband reference signal received power (NRSRP) parameter based at least in part on the NPBCH signal power.

2. The method of claim 1, wherein the NRSRP parameter is estimated using the NPBCH signal power and a ratio between the NPBCH signal power and a signal power associated with a set of narrowband reference signals.

3. The method of claim 1, wherein the NRSRP parameter is estimated using the NPBCH signal power based at least in part on an indication, from a base station, that NPBCH-based NRSRP estimates are enabled for the UE.

4. The method of claim 1, further comprising receiving an indication, from a base station, of whether NPBCH-based NRSRP estimates are enabled or disabled for the UE.

5. The method of claim 4, wherein the indication is received in a system information block (SIB) associated with a cell.

6. The method of claim 1, wherein the NRSRP parameter is estimated for a serving cell.

7. The method of claim 1, wherein using the NPBCH signal power reduces at least one of a discontinuous reception (DRX) cycle wake time or an NRSRP measurement period for the UE as compared to estimating the NRSRP parameter using only a set of narrowband reference signals.

8. The method of claim 1, wherein determining the NPBCH signal power comprises:
   decoding a first MIB of the plurality of MIBs;
   generating a reference MIB using the decoded first MIB; and
   comparing the reference MIB and a second MIB of the plurality of MIBs.

9. The method of claim 1, further comprising estimating the NRSRP parameter using a set of narrowband reference signals based at least in part on a determination that semi-static content, included in the plurality of MIBs, has changed.

10. The method of claim 1, further comprising disabling narrowband reference signal measurements based at least in part on a determination that a correlation value associated with the plurality of MIBs satisfies a threshold.

11. The method of claim 1, wherein the NRSRP parameter is estimated using only the NPBCH signal power and not a signal power determined for a set of narrowband reference signals.

12. The method of claim 1, wherein the NRSRP parameter is estimated using the NPBCH signal power and a signal power determined for a set of narrowband reference signals.

13. A method of wireless communication performed by a base station, comprising:
   determining whether to enable or disable narrowband physical broadcast channel (NPBCH)-based estimates of a narrowband reference signal received power (NRSRP) parameter for a user equipment (UE); and
   transmitting, to the UE, an indication of whether NPBCH-based estimates of the NRSRP parameter are enabled or disabled for the UE based at least in part on the determination.

14. The method of claim 13, wherein the determination is based at least in part on a relative power between NPBCH transmissions and narrowband reference signal (NRS) transmissions.

15. The method of claim 13, wherein the determination is based at least in part on a frequency with which content of a master information block (MIB) change.

16. A user equipment (UE) for wireless communication, comprising:
   a memory; and
   one or more processors operatively coupled to the memory, the memory and the one or more processors configured to:
      receive a plurality of master information blocks (MIBs) on a narrowband physical broadcast channel (NPBCH);
      determine an NPBCH signal power based at least in part on the plurality of MIBs; and
      estimate a narrowband reference signal received power (NRSRP) parameter based at least in part on the NPBCH signal power.

17. The UE of claim 16, wherein the NRSRP parameter is estimated using the NPBCH signal power and a ratio between the NPBCH signal power and a signal power associated with a set of narrowband reference signals.

18. The UE of claim 16, wherein the NRSRP parameter is estimated using the NPBCH signal power based at least in part on an indication, from a base station, that NPBCH-based NRSRP estimates are enabled for the UE.

19. The UE of claim 16, wherein the one or more processors are further configured to receive an indication, from a base station, of whether NPBCH-based NRSRP estimates are enabled or disabled for the UE.

20. The UE of claim 19, wherein the indication is received in a system information block (SIB) associated with a cell.

21. The UE of claim 16, wherein the NRSRP parameter is estimated for a serving cell.

22. The UE of claim 16, wherein using the NPBCH signal power reduces at least one of a discontinuous reception (DRX) cycle wake time or an NRSRP measurement period for the UE as compared to estimating the NRSRP parameter using only a set of narrowband reference signals.

23. The UE of claim 16, wherein the one or more processors, when determining the NPBCH signal power, are configured to:
   decode a first MIB of the plurality of MIBs;
   generate a reference MIB using the decoded first MIB; and
   compare the reference MIB and a second MIB of the plurality of MIBs.

24. The UE of claim 16, wherein the one or more processors are further configured to estimate the NRSRP parameter using a set of narrowband reference signals based at least in part on a determination that semi-static content, included in the plurality of MIBs, has changed.

25. The UE of claim 16, wherein the one or more processors are further configured to disable narrowband reference signal measurements based at least in part on a determination that a correlation value associated with the plurality of MIBs satisfies a threshold.

26. The UE of claim 16, wherein the NRSRP parameter is estimated using only the NPBCH signal power and not a signal power determined for a set of narrowband reference signals.

27. The UE of claim 16, wherein the NRSRP parameter is estimated using the NPBCH signal power and a signal power determined for a set of narrowband reference signals.

28. A base station for wireless communication, comprising:
   a memory; and
   one or more processors operatively coupled to the memory, the memory and the one or more processors configured to:
      determine whether to enable or disable narrowband physical broadcast channel (NPBCH)-based estimates of a narrowband reference signal received power (NRSRP) parameter for a user equipment (UE); and
      transmit, to the UE, an indication of whether NPBCH-based estimates of the NRSRP parameter are enabled or disabled for the UE based at least in part on the determination.

29. The base station of claim 28, wherein the determination is based at least in part on a relative power between NPBCH transmissions and narrowband reference signal (NRS) transmissions.

30. The base station of claim 28, wherein the determination is based at least in part on a frequency with which content of a master information block (MIB) change.

\* \* \* \* \*